United States Patent
Pandey et al.

(10) Patent No.: US 11,314,742 B2
(45) Date of Patent: Apr. 26, 2022

(54) CACHING TIME-SENSITIVE DATA VIA SLIDING WINDOW PARTITIONS

(71) Applicant: Morgan Stanley Services Group Inc., New York, NY (US)

(72) Inventors: Rakesh Kumar Pandey, Maharastra (IN); Harish Sankaran, New York, NY (US); Gaurav Garg, Maharastra (IN)

(73) Assignee: Morgan Stanley Services Group Inc., New York, NY (US)

( * ) Notice: Subject to any disclaimer, the term of this patent is extended or adjusted under 35 U.S.C. 154(b) by 37 days.

(21) Appl. No.: 16/727,701

(22) Filed: Dec. 26, 2019

(65) Prior Publication Data

US 2021/0200770 A1 Jul. 1, 2021

(51) Int. Cl.
| | |
|---|---|
| *G06F 16/00* | (2019.01) |
| *G06F 16/2455* | (2019.01) |
| *G06F 16/28* | (2019.01) |
| *G06F 16/23* | (2019.01) |
| *G06F 16/27* | (2019.01) |

(52) U.S. Cl.
CPC .... *G06F 16/24552* (2019.01); *G06F 16/2379* (2019.01); *G06F 16/284* (2019.01); *G06F 16/278* (2019.01)

(58) Field of Classification Search
CPC .......... G06F 16/24552; G06F 16/2379; G06F 16/284; G06F 16/278
USPC ....................................................... 707/694
See application file for complete search history.

(56) References Cited

U.S. PATENT DOCUMENTS

| 7,945,540 B2 | 5/2011 | Park et al. |
| 8,086,583 B2 | 12/2011 | Crutchfield et al. |
| 11,106,680 B2 * | 8/2021 | Shikano ................ H04L 67/125 |
| 2003/0055822 A1 * | 3/2003 | Yu ......................... G06F 16/278 |

(Continued)

FOREIGN PATENT DOCUMENTS

WO    WO-0215054 A2 *  2/2002   ........... G06F 16/284

OTHER PUBLICATIONS

Sundar, Nat. "Implemenlaltion of Sliding Window Partitioning in SQL Server to Purge Data". Feb. 22, 2018. https://www.mssqltips.com/sqlservertip/5296/implementation-of-sliding-window-partitioning-in-sql-server-to-purge-data/.

(Continued)

*Primary Examiner* — Vincent F Boccio
(74) *Attorney, Agent, or Firm* — Weitzman Law Offices, LLC

(57) ABSTRACT

A system for low latency caching of time-sensitive data is disclosed. The system comprises a database, one or more processors, and non-transitory memory. The non-transitory memory comprises instructions that cause the one or more processors to divide a table of the database into a plurality of logical partitions; during a first interval of time, insert new records exclusively into a first partition of the plurality of logical partitions; during a second interval of time, insert new records exclusively into a second partition of the plurality of logical partitions; during a subsequent interval of time, determine that a predetermined period of time has passed since conclusion of the first interval of time; and responsive to the determination that the predetermined period of time has passed, delete records from the first partition without changing contents of the second partition or any other partition of the plurality of logical partitions.

16 Claims, 6 Drawing Sheets

(56) References Cited

U.S. PATENT DOCUMENTS

2004/0243839 A1* 12/2004 Bhatia ................ G06F 21/6218
726/4

OTHER PUBLICATIONS

Little, Kendra. "Sliding Window Table Partitioning: What to Decide Before You Automate". Feb. 2, 2016. https://littlekendra.com/2016/02/02/slidlng-window-table-partitioning-what-to-decide-before-you-automate/.

* cited by examiner

300

305a
- lorem
- ipsum
- dolor
- sit
- amet
- consectetur
- adipiscing
- elit
- sed
- do
- ...

Created 9:40 AM

305b
- eiusmod
- tempor
- incididunt
- ut
- labore
- et
- dolore
- magna
- aliqua
- ut
- ...

Created 9:45 AM

305c
- enim
- ad
- minim
- veniam
- quis
- nostrud
- exercitation
- ullamco
- laboris
- nisi
- ...

Created 9:50 AM

305d
- ut
- aliquip
- ex
- ea
- commodo
- consequat
- duis
- aute
- irure
- dolor
- ...

Created 9:55 AM

305e
- in
- reprehenderit
- in
- voluptate
- velit
- esse
- cillum

Created 10:00 AM

310

(Current Time: 10:04 AM)

(Current Time: 10:05 AM)

300

305b: eiusmod, tempor, incididunt, ut, labore, et, dolore, magna, aliqua, ... Created 9:45 AM 305c: enim, ad, minim, veniam, quis, nostrud, exercitation, ullamco, laboris, nisi, ... Created 9:50 AM 305d: ut, aliquip, ex, ea, commodo, consequat, duis, aute, irure, dolor, ... Created 9:55 AM 305e: in, reprehendit, in, voluptate, velit, esse, cillum, dolore, eu, fugiat, ... Created 10:00 AM 305f: nullit — 315 — Created 10:05 AM

305b: eiusmod, tempor, incididunt, ut, labore, et, dolore, magna, aliqua, ut, ... Created 9:45 AM 305c: enim, ad, minim, veniam, quis, nostrud, exercitation, ullamco, laboris, nisi, ... Created 9:50 AM 305d: ut, aliquip, ex, ea, commodo, consequat, duis, aute, irure, dolor, ... Created 9:55 AM 305e: in, reprehendit, in, voluptate, velit, esse, cillum, dolore, eu, fugiat, ... Created 10:00 AM 305f: nullit, pariatur, excepteur, sint, occaecat, cupidatat Created 10:05 AM

310

(Current Time: 10:09 AM)

CACHING TIME-SENSITIVE DATA VIA SLIDING WINDOW PARTITIONS

FIELD OF INVENTION

This application relates to systems and methods for managing database structures and records, and more specifically, an automated system for organizing a database into partitions based on the age of records and removing older records to manage database size and query latency.

BACKGROUND

In some systems, events occur at a very high rate and which a monitor may desire to record for imminent use, but that will quickly become useless as later data supersedes it. For example, a black box in an airplane may be configured to attempt to record the status of every instrument and sensor every millisecond, but only to be used for the last five minutes of the airplane's flight, such that any data more than five minutes old is considered worthless. A server for a multiplayer game may be receiving input from a group of players constantly, and need to store it all so that if a network failure occurs, the game can be rolled back to the last moment when all players were available, earlier moments' data being unnecessary. A weather forecast system may receive radar and weather station information from a multitude of sources in order to provide real-time data to simulations but not need historical data. An agent at a stock exchange may receive notifications of thousands of asset trades per second and only need to act on the most recent trades actually defining the current price of an asset.

Because new records can be generated for insertion at an incredible pace, over time, the database's performance when querying the logged events will tend to suffer, increasing latency in systems where sometimes every microsecond may matter.

In some systems, no records are archived or purged except at the end of a lengthy given interval, such as at night at the end of a twenty-four-hour interval, when use of the system may be minimal or a temporary increase in latency may not be noticed. During this interval, the number of records to traverse during a query constantly increases, and query latency near the end of the interval becomes unacceptably high.

In other systems, records are archived or purged much more often, but read access must be temporarily locked while the older records are being identified and moved or deleted. During the fractions of a second when each of these updates occur, the database is completely unusable.

Thus, there is a need for a method of structuring a database that allows the database to always provide low-latency read and write access while inserting and removing large numbers of time-sensitive records over a short period of time.

SUMMARY OF THE INVENTION

A system for low latency caching of time-sensitive data is disclosed. The system comprises a database managed by a relational database management system, one or more processors, and non-transitory memory. The non-transitory memory comprises instructions that, when executed by the one or more processors, cause the one or more processors to divide a table of the database into a plurality of logical partitions; during a first interval of time, insert new records exclusively into a first partition of the plurality of logical partitions; during a second interval of time, insert new records exclusively into a second partition of the plurality of logical partitions; during a subsequent interval of time, determine that a predetermined period of time has passed since conclusion of the first interval of time; and responsive to the determination that the predetermined period of time has passed, delete all records from the first partition without changing contents of the second partition or any other partition of the plurality of logical partitions.

A computer implemented method for low latency caching of time-sensitive data is also disclosed. The method comprises dividing a table of a database into a plurality of logical partitions; during a first interval of time, automatically inserting new records exclusively into a first partition of the plurality of logical partitions; during a second interval of time, automatically inserting new records exclusively into a second partition of the plurality of logical partitions; during a subsequent interval of time, automatically determining that a predetermined period of time has passed since conclusion of the first interval of time; and responsive to the determination that the predetermined period of time has passed, deleting all records from the first partition without changing contents of the second partition or any other partition of the plurality of logical partitions.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

FIGS. 3A-3C depict a table at different points in time of the update method.

DETAILED DESCRIPTION

In order to address the issues described above, a data caching system is described below wherein a mainframe's data storage is augmented by a relational database management system that caches a most-recent subset of the mainframe's data and is able to deliver that data with extremely low latency. Latency during both insertion to and retrieval from the database is minimized by use of a cycling set of logical partitions within tables of the database, as will be described further below.

Figure 1:
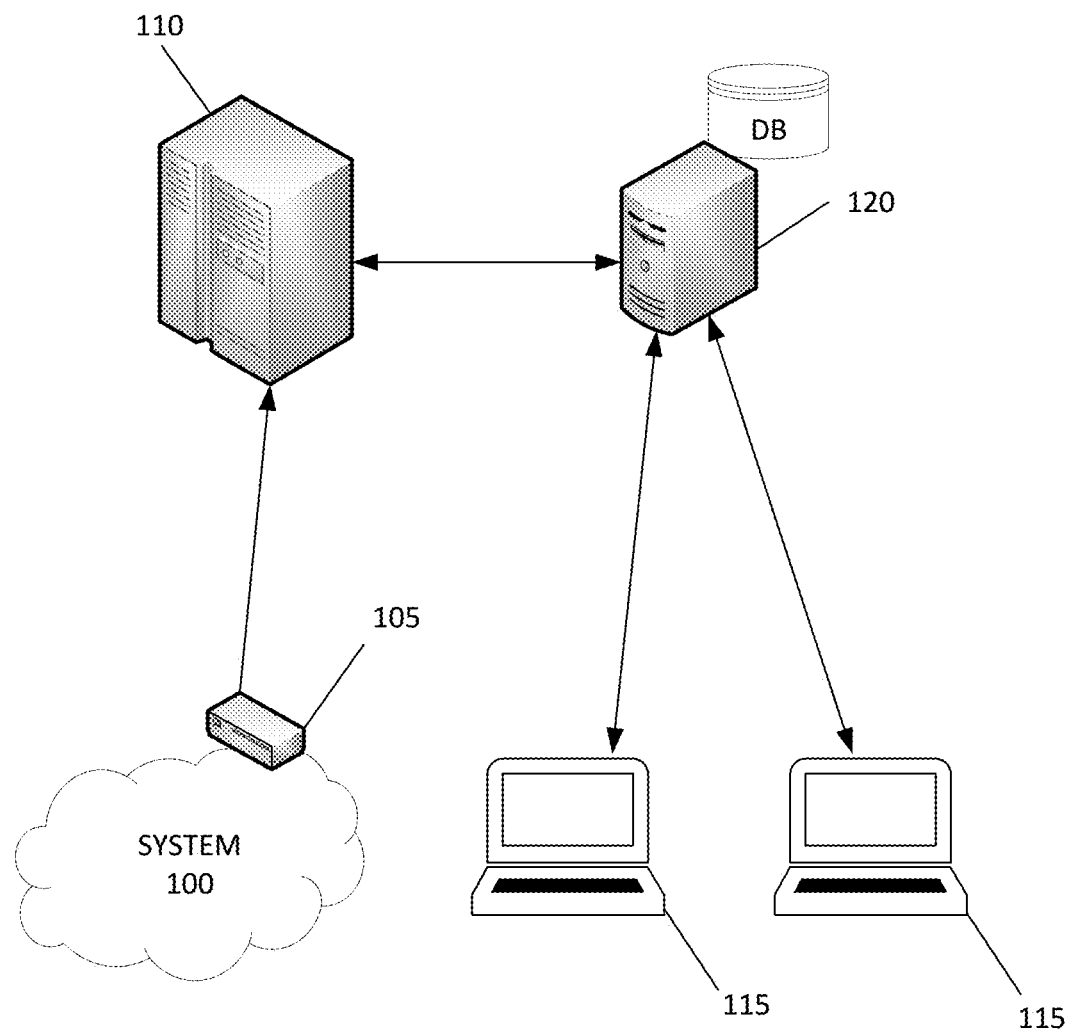
FIG. 1 depicts a system of computing devices for capturing and storing event data in an ultra-low latency cache according to methods disclosed herein.

FIG. 1 depicts a system of computing devices for capturing and storing event data in an ultra-low latency cache according to methods disclosed herein.

The presently described data cache constantly stores new information related to some monitored system or network 100 in which events are occurring. Examples, as noted previously above, may include a computer network 100 in which the generation of data packets or protocol requests are monitored to identify and prevent a denial of service attack; a multitude of clients 100 of an online multiplayer game generating information to a central server about players' decisions; an environment or region 100 in which weather events are occurring and in which many parameters such as temperature, wind speed, and humidity may be monitored; a stock exchange 100 in which offers for and trades of a plurality of assets are performed; or a vehicle 100 in which a black box is constantly storing measurements of instruments, controls, and other information pertinent to the control of the vehicle.

A device 105 receives or records the events within the monitored system 100 for storage within a mainframe 110, which stores a master copy of all received data. Device 105 may be, for example, a computer implementing an application programming interface (API) and receiving API requests from the monitored system 100, a computer running software that monitors the contents of a message queue or the packets traveling through a network, or even a sensor observing events occurring in some physical system.

Meanwhile, one or more client computers 115 may have a need to query the stored data for particular values. Rather than allow them to directly interface with the mainframe 110, an intermediary server 120 with a database is set up to cache relevant subsets of the data in mainframe 110 and provide a quicker response to the clients 115.

The intermediary server 120 preferably acts as a host running software in the Microsoft SQL Server family, from the SQL Server 2016 version or later. However, other versions of database software that use the structured query language protocol (SQL), such as MySQL, Oracle SQL, etc., may be used. Further, even non-SQL relational database management systems may be used, so long as they have the functionalities described further below to establish logical partitions within tables.

Whenever a client 115 needs information stored by the mainframe 110, a message is transmitted to the intermediary server 120, which will find and return the data immediately if it is locally stored, or obtain the data from the mainframe 110 if and only if necessary. As a result, the intermediary server 120 allows the indirection of an API that promises to return fresh, time-sensitive data to applications that request it, while preventing unnecessary system load on the mainframe 110 and allowing greater efficiency by referring to data already stored in the cache on the intermediary server 120 when subsequent requests from clients require the same data, rather than re-requesting it from the mainframe 110.

Although a system is described here in which four computing devices 105, 110, 115, and 120 are treated as separate computing devices, other configurations are possible in which additional devices are added (dividing between them the functionality ascribed to a single device) or devices are removed (and in which a single general purpose computer performs multiple functionalities described throughout the paragraphs above and below).

For example, a single server may directly receive data, store all the data, and provide an API for a recent subset of the data, so that it acts as devices 105, 110, and 120, with no transmission of information between devices, only passing of information between different software modules in the same device. Similarly, a client computer may store a cache locally to limit outgoing network calls, combining the functionality of devices 115 and 120.

In order to maintain responsiveness and reduce the latency of the API facilitated by the intermediary server 120, the actual volume of records stored in the SQL or other database must be minimized. Fortunately, when the nature of the data is time-sensitive and "stale" data will never be requested by a client and can be deleted, the number of records in each table can be managed—so long as the management process itself does not unacceptably increase latency by making the cache temporarily unavailable when being updated.

This management is largely accomplished by dividing every table that stores time-sensitive data into multiple logical partitions (as depicted further below in FIG. 3) and managing the partitions while rarely interacting with any records individually.

Although conceptually, physical partitions would work within the presently described method, logical partitions are preferred for the faster update time and read access, and the lack of need for files within a filesystem to handle the physical partitions.

Figure 2:
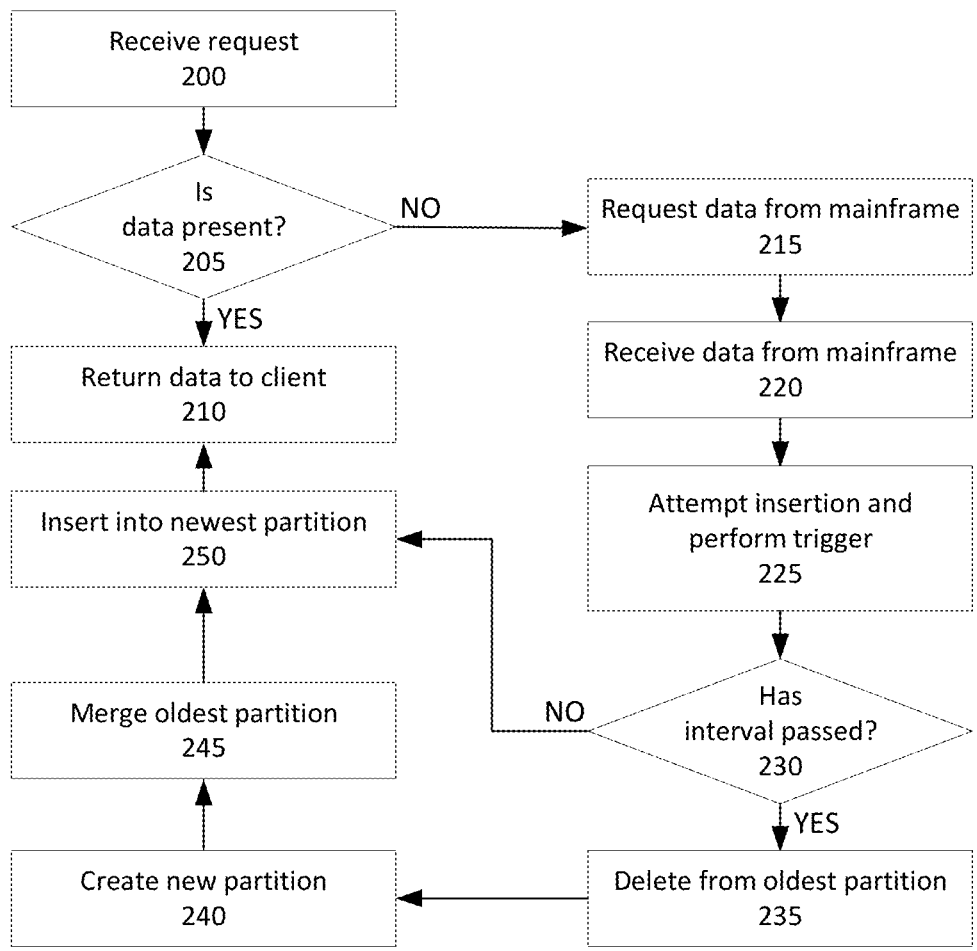
FIG. 2 depicts, in simplified form, a method of inserting a new record into the data cache.

FIG. 2 depicts, in simplified form, a method of requesting a record from the data cache.

When the intermediate server 120 receives a request from the client 115 (Step 200), there is an initial check to determine whether the data is present (Step 205). The query to check for data presence may simply join all the partitions of a single table and then query based on an indexed key for that table, nearly instantly determining whether the record is present due to the total table size being kept at a manageable level. If the data is present, it is returned to the client (Step 210) and the intermediate server returns to a passive state of waiting for the next client request.

If the data is not present, the intermediate server 120 requests the data from the mainframe 110 (Step 215). Upon receiving the data (Step 220), insertion into the table is attempted, which automatically causes an SQL trigger stored on the database and associated with insertion to be executed (Step 225).

Each table of the database is divided, prior to the insertion of data, into a number of logical partitions, each associated with a particular creation timestamp (see FIGS. 3A-3C). If a predetermined period of time has passed (Step 230) since the last time a partition was created, three steps are performed substantially simultaneously:

all records from the oldest partition are deleted (Step 235),
    a new partition is created for the next immediate window of time (Step 240), and
    the now-empty oldest partition is preferably merged into the second-oldest partition (Step 245) to prevent the buildup of excess partitions.

For example, an SQL trigger may use code similar to the following:

```
CREATE TRIGGER trg_TFA_NRS_LKUP_Insert ON TFA_NRS_LKUP
WITH EXECUTE AS 'DBO'
INSTEAD OF INSERT
AS
BEGIN
    --Slide Partition & Truncate Stage Table
    DECLARE @DT_SLIDE_FP DATETIME, @DT_SLIDE_LP DATETIME
    INSERT INTO TFA_NRS_LKUP SELECT * FROM INSERTED
    SELECT @DT_SLIDE_FP=MIN(CAST(ISNULL(PRV.VALUE,'UNDEFINED') AS
```

```
DATETIME)), @DT_SLIDE_LP=MAX(CAST(ISNULL(PRV.VALUE,'UNDEFINED')
AS DATETIME))
    FROM SYS.OBJECTS O
        INNER JOIN SYS.PARTITIONS P ON P.OBJECT_ID = O.OBJECT_ID
        INNER JOIN SYS.INDEXES I ON P.OBJECT_ID = I.OBJECT_ID AND
P.INDEX_ID = I.INDEX_ID
        INNER JOIN SYS.DATA_SPACES DS ON I.DATA_PACE_ID =
DS.DATA_SPACE_ID
        INNER JOIN SYS.PARTITION_SCHEMES PS ON DS.DATA_SPACE_ID =
PS.DATA_SPACE_ID
        LEFT OUTER JOIN SYS.PARTITION_RANGE_VALUES PRV ON
PRV.FUNCTION_ID = PS.FUNCTION_ID AND P.PARTITION_NUMBER =
PRV.BOUNDARY_ID
    WHERE O.NAME ='TFA_NRS_LKUP' AND I.TYPE IN (0,1) AND PRV.VALUE IS
NOT NULL
    IF (@DT_SLIDE_FP < DATEADD(MI,-15,GETDATE( )))
    BEGIN
        TRUNCATE TABLE TFA_NRS_LKUP WITH (PARTITIONS(1))
        ALTER PARTITION FUNCTION [Partition_Function_By_Hour]( ) MERGE
RANGE (@DT_SLIDE_FP)
        ALTER PARTITION SCHEME Partition_Scheme_By_Hour NEXT USED
[PRIMARY]
        SET @DT_SLIDE_LP = DATEADD(MI,5,@DT_SLIDE_LP)
        ALTER PARTITION FUNCTION [Partition_Function_By_Hour]( ) SPLIT
RANGE (@DT_SLIDE_LP)
    END
END
GO
```

The predetermined period of time and total number of partitions may be customized based on the application needs or the nature of the data. For example, in a weather system monitor, temperature information may be considered relevant even if one hour old, leading a system to use five partitions with a fifteen-minute interval each, so that deletion of the oldest partition is always guaranteed to delete data that is at least one hour old. In a stock ticker monitor, by contrast, data may be stale within minutes, and a much shorter period may be desired. A developer would only need to update the "−15" and the "5" constants in the above SQL trigger to achieve a desired number of partitions and length of time for which they will last. As a result of the above trigger, there will always be a number of partitions, each responsible for storing records from a recent interval of time whose length is determined by the constant in the trigger, and as soon as one interval ends, another partition will store records generated during the following contiguous interval of time.

At the conclusion of the trigger, the new data is inserted into the most recently created partition of the table (Step 250), whether the trigger just created that partition, or abstained from creating any new partition.

Finally, the requested data is returned to the client (back to Step 210 by an alternate path) and the intermediate server returns to passively waiting for another request, which, if it requests the same data as the previous request, will result in a much faster return of data since the data is now cached locally and no call to the mainframe 110 is needed.

FIGS. 3A-3C depict a database table at multiple stages of the update method.

At a first moment in time, table 300 consists of five logical partitions 305a-305e, as depicted in FIG. 3A. The newest partition 305e has been established approximately four minutes previously, and in this application a predetermined interval of five minutes is established between partitions sliding. All records 310 that are being added are inserted into the newest partition 305e, and the contents of partitions 305a-305d are essentially immutable and static.

At a second moment in time about one minute later (depicted in FIG. 3B), the first insertion is attempted after the partitions have aged by the full predetermined interval of five minutes. The oldest partition 305a is dropped from the table, and a newest partition 305f is added. The particular record 315 that was to be inserted—and whose attempted insertion triggered the change in partitions—is added to the empty new partition 305f.

At a third moment in time four minutes after that (depicted in FIG. 3C), the newest partition 305f is filling up, while the other partitions 305b-e are again static. Shortly after this moment in time, the update will occur again, causing the oldest partition 305b to be dropped, and so on.

One advantage of the present scheme is that it enables the omission of WHERE clauses in queries based on the timestamp of records. Because the data is time-sensitive and an older record is neither wanted nor promised to be available, the present data structures are able to shift the burden of filtering out older data from the WHERE clause (such as "SELECT * FROM data WHERE id='x' AND timestamp >now( )−ten minutes") into the data structure itself, such that "SELECT * FROM data WHERE id='x'" implicitly contains the second WHERE clause. As a result, there is no need for a clause that generates latency when evaluated by the parser in an RMDBS, and no opportunity for a typographical or conceptual error in expressing the clause to cause a software bug.

A second advantage of the present scheme is that it minimizes the data storage needed within the partitioned tables, compared to a system that continually accumulates, storing all of the data past the point that it is stale due to time-sensitivity, and only processes the data via a filter at a later time. Further, there is no need for a staging table or extra storage space during the cleanup step, as data is simply deleted from the live table rather than copied to another location for filtering back only a subset of the data to the live table. The total cost of ownership (TCO) of the system can be drastically reduced because the data footprint at any moment in time is lower than a system that continually accumulates data, and the database infrastructure will be cheaper if less storage space is needed.

However, the most striking advantages are found in the decreased number of logical reads and improved response times when querying the table. Compared to a naïve scheme of a nightly batch process deleting stale data from the tables that accumulated throughout the day, the number of logical reads was reduced by 99.7% (from 4,776 to 12) and query response times were improved from 10 ms down to 1 ms.

Figure 4:
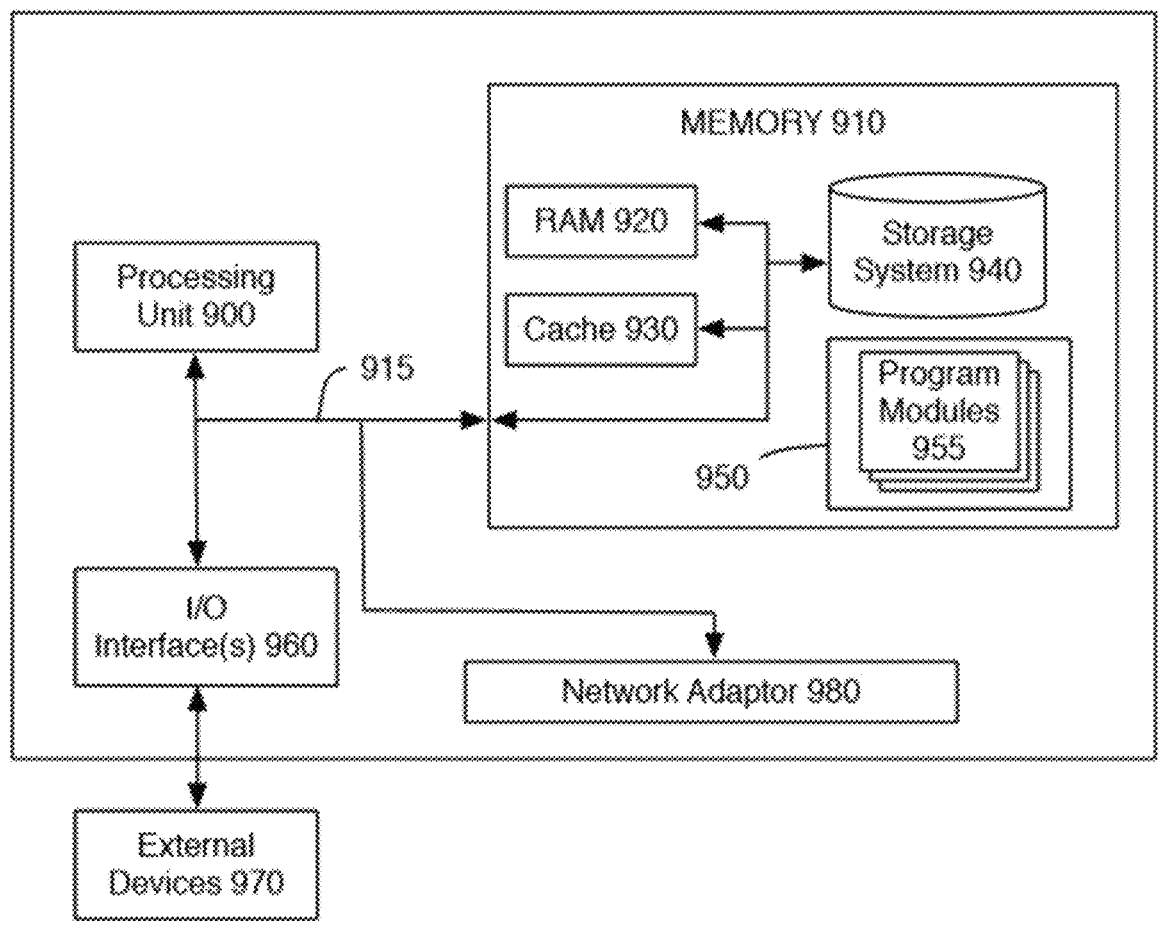
FIG. 4 is a high-level block diagram of a representative computing device that may be utilized to implement various features and processes described herein.

The software-implemented methods described above do not generally rely on the use of any particular specialized computing devices, as opposed to standard desktop computers and/or web servers. For the purpose of illustrating possible such computing devices, FIG. 4 is a high-level block diagram of a representative computing device that may be utilized to implement various features and processes described herein, including, for example, those of computing devices 105, 110, 115, or 120. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for low latency caching of time-sensitive data, comprising:
    a database managed by a relational database management system;
    one or more processors; and
    non-transitory memory comprising instructions that, when executed by the one or more processors, cause the one or more processors to:
        divide a table of the database into a plurality of logical partitions, each logical partition having a unique, one-to-one correspondence with an interval of time of equal duration;
        during a first interval of time having the equal duration, insert new records exclusively into a first logical partition of the plurality of logical partitions;
        during a second interval of time having the equal duration, insert new records exclusively into a second logical partition of the plurality of logical partitions;
        in response to every insertion query to the table during a subsequent interval of time, determine whether a predetermined period of time has passed since conclusion of the first interval of time; and
        responsive to a determination that the predetermined period of time has passed, delete all records from first logical partition without changing contents of the second logical partition or any other logical partition of the plurality of logical partitions.

2. The system of claim 1, further comprising a remote mainframe, and wherein records that are inserted are received from the mainframe.

3. The system of claim 2, wherein, when a selection query to the database occurs, records are retrieved from the mainframe if and only if they are not already present in the database.

4. The system of claim 1, wherein the table comprises a timestamp column, and wherein a selection query to the table that does not refer to the timestamp column is nonetheless guaranteed to return only records within a predetermined range of possible timestamps.

5. The system of claim 1, wherein each interval of time is contiguous with another interval of time with which a logical partition of the plurality of logical partitions corresponds.

6. The system of claim 1, wherein the relational database management system uses the Structured Query Language (SQL).

7. The system of claim 1, wherein the non-transitory memory comprises instructions that, when executed by the one or more processors, further cause the one or more processors to:
provide an application programming interface (API) for querying the database that guarantees all data returned from the table will have been inserted at no earlier than a predetermined interval in the past.

8. The system of claim 1, wherein no more than a maximum number of logical partitions are ever maintained, equal to one plus the predetermined period of time divided by the equal duration.

9. A computer implemented method for low latency caching of time-sensitive data, comprising:
dividing a table of a database into a plurality of logical partitions, each logical partition having a unique, one-to-one correspondence with an interval of time of equal duration;
during a first interval of time having the equal duration, automatically inserting new records exclusively into a first logical partition of the plurality of logical partitions;
during a second interval of time having the equal duration, automatically inserting new records exclusively into a second logical partition of the plurality of logical partitions;
in response to every insertion query to the table during a subsequent interval of time, automatically determining whether a predetermined period of time has passed since conclusion of the first interval of time; and
responsive to a determination that the predetermined period of time has passed, deleting all records from the first logical partition without changing contents of the second logical partition or any other logical partition of the plurality of logical partitions.

10. The method of claim 9, wherein records that are inserted are received from a remote mainframe.

11. The method of claim 10, wherein, when a selection query to the database occurs, records are retrieved from the mainframe if and only if they are not already present in the database.

12. The method of claim 9, wherein the table comprises a timestamp column, and wherein a selection query to the table that does not refer to the timestamp column is nonetheless guaranteed to return only records within a predetermined range of possible timestamps.

13. The method of claim 9, wherein each interval of time is contiguous with another interval of time with which a logical partition of the plurality of logical partitions.

14. The method of claim 9, wherein the database is managed by a relational database management system that uses SQL.

15. The method of claim 9, further comprising:
providing an API for querying the database that guarantees all data returned from the table will have been inserted at no earlier than a predetermined interval in the past.

16. The method of claim 9, wherein no more than a maximum number of logical partitions are ever maintained, equal to one plus the predetermined period of time divided by the equal duration.

* * * * *